United States Patent

Marsden

[15] 3,661,628
[45] May 9, 1972

[54] INORGANIC OXIDE SUBSTRATE COATED WITH WATER DISPERSIBLE ETHYLENE AND ACRYLIC-METHACRYLIC COPOLYMER SALTS WITH SILOXANE

[72] Inventor: James G. Marsden, Amawalk, N.Y.
[73] Assignee: Union Carbide Corporation, New York, N.Y.
[22] Filed: Sept. 29, 1969
[21] Appl. No.: 862,027

Related U.S. Application Data

[63] Continuation-in-part of Ser. No. 729,948, May 17, 1968, abandoned.

[52] U.S. Cl. .................. 117/126 GS, 117/72, 117/100 SI, 117/124 F, 117/161 ZA, 161/193, 161/208, 161/DIG. 4, 260/29.6 NR, 260/29.6 GH, 260/29.6 HN, 260/29.6 Z
[51] Int. Cl. ............... C03c 17/03, C03c 25/00, C08f 35/02, C09d 3/82
[58] Field of Search ........ 260/29.6 RW, 29.6 KW, 29.6 WW, 260/29.6 Z, 29.6 HN, 29.6 H, 29.6 NR; 117/118, 126 GB, 102, 123 B, 123 D, 124 F, 127, 128, 128.4, 161 ZA, 135.1, 126 GS; 161/193, 208, DIG. 4

[56] References Cited

UNITED STATES PATENTS

| | | | |
|---|---|---|---|
| 3,249,461 | 5/1966 | Grotenhuis | 117/126 |
| 3,252,825 | 5/1966 | Mazocchi | 117/126 |
| 3,427,187 | 2/1969 | Wiggill | 117/118 |
| 3,321,819 | 4/1967 | Walter et al. | 117/102 |
| 3,305,504 | 2/1967 | Huntington | 117/135.1 X |
| 3,428,599 | 2/1969 | Newing | 117/135.1 X |
| 3,433,764 | 3/1969 | Walmsley | 117/135.1 X |
| 3,454,454 | 7/1969 | Sterman et al. | 117/126 GS X |
| 3,455,725 | 7/1969 | Jex et al. | 117/123 D X |
| 3,493,461 | 2/1970 | Sterman et al. | 117/126 GS X |
| 3,508,950 | 4/1970 | Marzocchi | 117/72 |
| 3,537,882 | 11/1970 | Wiggill | 117/72 |
| 3,561,996 | 2/1971 | Young | 117/72 |
| 3,575,910 | 4/1971 | Thomas | 117/135.1 X |
| 3,513,049 | 4/1970 | Marzocchi | 117/126 |

OTHER PUBLICATIONS

Vanderbilt, Byron M. " Effectiveness of Coupling Agents in Glass-Reinfored Plastics." In Modern Plastics, Sept. 1959, pp. 125–127, 130, 132, 198, 200.

Primary Examiner—Philip E. Anderson
Attorney—Paul A. Rose, George A. Skoler and Aldo John Cozzi

[57] ABSTRACT

This invention involves treating an inorganic substrate with an organo-functional siloxane and a water dispersible salt of a copolymer of ethylene and acrylic and/or methacrylic acid. The invention is specifically characterized by the treatment of glass fiber as the substrate and the incorporation of the treated glass fiber in polyolefin molding resins for the purpose of making a reinforced composite.

7 Claims, No Drawings

AN INORGANIC OXIDE SUBSTRATE COATED WITH WATER DISPERSIBLE ETHYLENE AND ACRYLIC-METHACRYLIC COPOLYMER SALTS WITH SILOXANE

This application is a continuation-in-part of copending application Ser. No. 729,948, filed May 17, 1968 and now abandoned.

This invention relates to the treatment of inorganic substrates to enhance bonding thereto of organic coatings. More particularly, this invention relates to the treatment of inorganic oxide substrates to enhance bonding thereto of olefin polymers.

This invention involves providing on an inorganic substrate, such as inorganic oxides and metals, an organofunctional siloxane and an ethylene-acrylic acid and/or methacrylic acid copolymer such that interreaction between the siloxane and copolymer is readily achievable. The resultant treated substrate finds admirable properties when used in combination with, for example, polyolefin resins. The organofunctional groups of the siloxane are bonded to silicon thereof by a carbon to silicon bond and contain at least one functional group which is condensible with the carboxylic acid groups of the copolymer.

The ethylene-acrylic acid and/or methacrylic acid copolymers employed in the practice of this invention are utilized in the form of water soluble salts of alkali metals, ammonia, or organo amines containing only one nitrogen atom therein possessing hydrogen bonded thereto.

There is described in the prior art such utilization of olefin copolymers containing free carboxylic groups for interreaction of organo-functional silanes and the application of the two to inorganic substrates. The prior art cites the use of such materials and the treatment of the inorganic substrates to enhance the utilization of such substrates in combination with polyolefin resins such as polypropylene. However, the copolymer possessing free carboxylic groups described by such prior art are not of the types readily producible and invariably are incapable of being rendered water-soluble. Therefore, the prior art requires the use of volatile and flammable organic solvents in combination with the copolymers and typically in combination with the silane. The net result is that such materials are particularly unsuitable for use in treatment of fiber glass because the treatment is effected near the hot bushing where the fiber is formed and withdrawn and thus creates significant flammability problems. A resin which will provide a treated fiber glass capable of ready dispersion in a polyolefin resin yet at the same time allows such treatment to be effected from a water system imposes severe limitations in selection.

The most widely employed polyolefins used in combination with fiber glass, whereby fiber glass acts to reinforce said polyolefin, are high density polyethylene and crystalline polypropylene. The general theory for treatment of fiber glass to enhance its use to reinforce such polyolefins has been based upon the compatibility of the treating agent with the reinforced polyolefin. For this reason, it has been recommended by the art that the preferred treating agent contain a plurality of polymer units which are theoretically soluble in the polyolefin. When reinforcing polypropylene such a unit has been propylene. The prior art has recommended that the copolymer employed with the silane treatment of fiber glass be a copolymer of propylene and a polycarboxylic acid, such as maleic acid. However, such propylene-maleic acid copolymers are only with extreme difficulty rendered water soluble, if water solubility is obtainable at all.

It was surprising to find that the soluble salts of an ethylene-acrylic and/or methacrylic copolymer, which are readily water soluble or dispersible when supplied to fiber glass in combination with condensible hydrolyzates of organofunctional silanes, greatly enhance the dispersibility of fiber glass in polyolefin resins. However, the selection of the ethylene-acrylic acid copolymer is limited in the practice of this invention to one having an acrylic acid content of at least 14 weight percent, based on the weight of the copolymer, to not more than 55 weight percent, based on the weight of the copolymer and such copolymer has a melt index range from 0.1 to 1,000 decigrams per minute.

The preferred monovalent cations in the copolymer salts of this invention are Na, K, Li and

wherein each of $R_1$, $R_2$ and $R_3$ is either hydrogen or monovalent organic radical, containing up to 10 carbon atoms. Such organic radicals may contain hydrophilic groups such as hydroxyl, amino, imino or cyclic ether groups wherein two of the organic radicals when taken together form a heterocyclic compound.

The monovalent organic radicals can be monovalent hydrocarbon radicals such as alkyl, cycloalkyl, aryl, alkaryl or aralkyl. Suitable alkyl radicals include methyl, ethyl and isopropyl. Representative cycloalkyl radicals include cyclobutyl, cyclopentyl and cyclohexyl. Representative aryl radicals include phenyl and naphthyl. Among the alkaryl and aralkyl radicals are, e.g., benzyl, cumyl, tolyl and xylyl radicals.

Representative monovalent organic radicals containing hydrophilic groups include hydroxyethyl (as found in monoethanolamine, diethanolamine, triethanolamine), dimethylaminopropyl, N,N-bis(hydroxyethyl)aminoethyl, N,N-bis(2-hydroxypropyl)aminoethyl, and the cation containing heterocyclic radicals as found in piperazinyl, 2,5-dimethyl piperazinyl, piperidinyl, morpholinyl, and the like.

These polymer carboxyl salts can be prepared by neutralizing the starting carboxyl containing polymer with metal salts, such as carbonates or bicarbonates, metal bases such as hydroxides or alkoxides, amine bases such as trimethyl ammonium hydroxide, mono-methyltriethyl ammonium hydroxide, dimethylphenyl ammonium hydroxide and the like, aliphatic amines such as ethanolamine, ethylene diamine N-(hydroxyethyl)ethylene diamine and the like, cyclic amines such as piperazine, pyridine, piperidine, morpholine and the like, metal alkyls such as sodium ethyl, butyl lithium and the like, metal aryls such as phenyl lithium, potassium naphthalene and the like, hydrides of sodium, potassium or lithium, amides of sodium or potassium, oxides such as sodium peroxide or in the case of alkali metal salts even with the free alkali metal itself. Preferred bases are alkyl ammonium hydroxides, ammonium hydroxide, lithium hydroxide, sodium hydroxide and potassium hydroxide. Any method known in the art can be used to effect this neutralization process.

These soluble copolymers are described in U.S. Pat. Nos. 3,445,362, 3,264,274 and 3,321,819 and these disclosures relative to such copolymers are incorporated herein by reference.

The siloxanes provided on the inorganic substrate are characterized by the repeating unit formula:

I     [XR'SiO$_{3/2}$]

where R' is a polyvalent saturated hydrocarbon radical containing at least three carbon atoms in sequence therein separating X from Si, and X is a functional group which is condensible with a carboxylic acid group; e.g., functional groups such as

HN—, HS—, HO—, O = C = N—, and the like. It is understood that when X is HS—, R' may contain two carbon atoms in sequence therein separating X from Si. These siloxanes are obtained by the hydrolysis and condensation of silanes such as those encompassed by the formula:

II     XR'SiY$_3$ wherein Y is any hydrolyzable group such as alkoxy, aroxy, halogen, amino, and the like. It should be understood that in the case of silane, when X is O = C = N—, the same functional group is not to be found in the siloxane since isocyanato is unstable to hydrolysis. However, the reaction product of isocyanato with water forms

which is a functional group pursuant to this invention. The isocyanato group can be put into the siloxane by phosgenation of an amino substituted siloxane followed by dehydrohalogenation. The siloxane will still be capable of further reaction and will securely bond to the inorganic substrate.

Specific illustrations of the aforementioned silanes are the following:

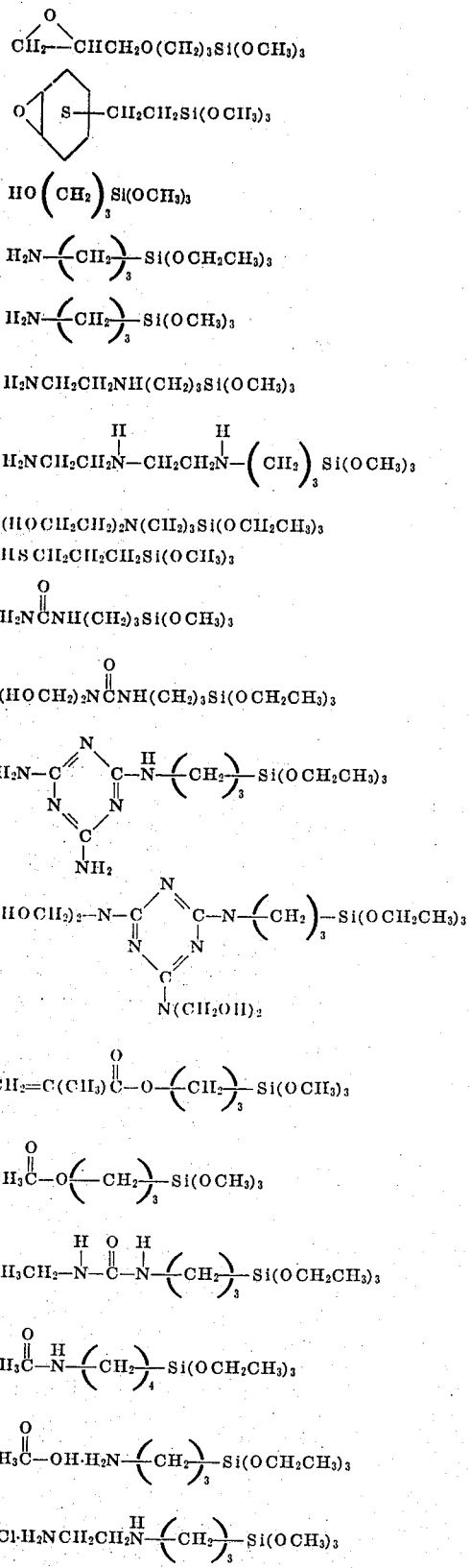

The silanes containing ester groups in the organic radical are believed capable of providing hydroxyl groups by in situ hydrolysis of the ester group during curing of the ethylene-acrylic acid copolymer on the substrate.

The inorganic substrates on which may be provided the siloxane and the ethylene-acrylic acid copolymer may be any metal, such as iron, steel, copper, nickel, alloys of the above, aluminum and the like; inorganic particulate fillers and pigments including inorganic oxide fillers and pigments such as siliceous and aluminum silicate fillers (e.g. silica, sand, clays, and the like), metal pigments such as the iron chromates, lead oxide, zinc oxide, titanium dioxide and the like; inorganic fibers, such as graphite fibers, glass fibers, tungsten fibers, and the like.

It has been determined that the provision of the aforementioned siloxane and ethylene copolymer on the substrates provides attributes to each substrate which are most unique. In the case of the metal substrates, a tough weather resistance coating is obtained, typically as resistant as more expensive coatings heretofore employed on such substrates in combination with silicones. Moreover, such coatings can be extremely good adhesives or primers for another coating supplied over them. Essentially any inorganic or organic coating is better bonded to the ethylene copolymer-siloxane layer(s). The ethylene copolymer of this invention is characterized by adhesive characteristics and essentially any polymeric or metal or inorganic oxide placed thereon is tenaciously bonded through the ethylene copolymer-siloxane layer to the metal substrate below.

It has also been determined that extremely thin layers of the aforementioned siloxane and ethylene copolymer can be provided on pigments to enhance their qualities and overall compatibility in other resin systems. This is particularly noted in the case of oleophilic polymers, such as the polyolefins, e.g., polyethylene, polypropylene, and the like. The rate of dispersion of a pigment or filler is enhanced by the treatment described herein, and the resulting product is characterized by better compatibility of the filler or pigment for the resin in which it is being incorporated.

This invention is particularly fruitful when the substrate is a gross siliceous product, such as glass, either in plate, bead, fiber or other form. It is found that the layer(s) supplied to the glass, for example in the case of plate glass, can be used in the manufacture of safety glass. Thus a laminate can be produced which contains the aforementioned layer sandwiched between two layers of plate glass, and a very effective bond, in fact a most tenacious bond, is obtainable.

In the case of glass which is to be processed, such as fiber glass, glass beads, and the like, the layer supplied to such substrates serves to protect them from damage which would normally occur as a result of the processing steps. The process of this invention finds most desirable qualities in the treatment of glass fiber which is to be employed in olefin-type resins. The incorporation of glass fiber in such resins is most difficult, simply because of the wetting problems associated with intermixing the two. The glass is not inclined to be readily blended with the resin, and the resin does not readily accept the glass. Therefore, substantial shear forces are required to obtain good intermixture and such forces resultantly destroy the glass fibers simply by breaking them down. It has been found that this problem can be materially minimized by treating the glass, prior to incorporation with the resin, with the layer, as defined above, and then supplying the treated glass fiber to the resin generally as chopped roving. It is noted that the resin most readily accepts the fiber, evidencing better compatibility, and the fiber glass withstands the shears, stresses and strains occurring during the blending operation and working that occurs in the molding steps, as is the case with injection molding and simple extrusion.

The substrate may be treated first with the siloxane followed by addition on the surface of the substrate of the ethylene copolymer or a blend of the silane, described above, and the ethylene copolymer can be made and supplied to the surface of the substrate. The siloxane units characterized by formula I provided on the surface of the substrate can exceed the mole concentration of carboxylic acid groups present in the copolymer supplied to the substrate. Generally, an equivalent amount of siloxane unit of formula I above may be employed based on equivalent amount or unit of carboxylic acid present in the ethylene copolymer. By equivalent amounts or units it is meant that there is at least one functional group as characterized by X in formula I for each carboxy group in the ethylene copolymer. In some cases it may be desirable to employ less than an equivalent amount. Usually more than an equivalent amount of siloxane yields no sufficient advantage but also no disadvantage. In most cases not more than about 60 weight percent of siloxane, based on the weight of the ethylene copolymer, is required. Some advantageous results are obtainable using amounts as small as 0.1 percent siloxane based on the weight of the ethylene copolymer.

The amount of copolymer employed depends upon the use to which the substrate is being employed. If the copolymer serves the function of laminating two pieces of glass together to make safety glass, the amount of ethylene copolymer is typically very large, for example, even as much as 25 percent by weight of the glass employed. Typically the amount of the ethylene copolymer provided on the substrate, based on the weight of the substrate, is very small, usually not in excess of about 10 weight percent, based on the weight of the substrate. Most usually the amount does not exceed 5 weight percent and can be as little as 0.1 weight percent and still obtain effective results in certain areas. For example, in the treatment of the glass fiber employed in reinforcement of olefin polymers such as polypropylene, one can typically employ amounts as small as 0.5 percent to 3 weight percent, based on the weight of the glass fiber.

When a two-step procedure is employed for supplying the siloxane and ethylene copolymer on the substrate surface, it is common first to coat with an aqueous solution of the silane hydrolyzate or siloxanol obtained by the hydrolysis and partial condensation of the silanes of formula II onto the substrate surface followed by drying, typically in a temperature in excess of 50° C., preferably in excess of 100° C. Those temperatures which would effect destruction of the siloxane should not be employed. Onto the coated substrate is supplied a coating of an aqueous solution or dispersion of the ethylene copolymer in salt form. When a dispersion is employed, part of the copolymer salt is in solution.

The silane can be pre-mixed with an aqueous solution of the soluble copolymer salts of alkali metals, ammonia, or organo amines containing only nitrogen atoms therein possessing only one hydrogen bonded thereto. The silane will hydrolyze in the solution to silanol and, depending on the silane employed and the residence time in such solution, an be partially condensed to the corresponding siloxanol.

After the mixture of copolymer and silanol or siloxanol is provided on the surface, it is heated to a temperature typically in excess of 75° C., and preferably in excess of 100° C., but below the temperature at which either the copolymer or the silane or siloxane is adversely affected, until essentially all the water is evaporated. It is believed that by this heat treatment there is obtained inter-reaction between the carboxy group of the copolymer and the functional groups of the siloxane leading to a more intimate bond of the copolymer to the substrate surface. The siloxane structure provides for more intimate and effective adhesion with the substrate surface. Some theories state that the siloxane chemically bonds with the surface, and others attribute good bonding to enhance wetting of the surface.

Regardless of which theory is accurate, the siloxane structure is believed to be that portion which provides the enhanced adhesion. The organofunctional moiety of the siloxane is believed to couple with the carboxy groups of the ethylene copolymer to achieve the most intimate bond possible between the copolymer and the substrate.

The following example is presented solely to illustrate this invention and not to limit it.

There is employed an aqueous dispersion of an ammonium salt of an ethylene-acrylic acid copolymer containing 19.8 weight percent, based on polymer solids, of mers from acrylic acid and a copolymer melt index of 44. The dispersion has a solids content of 19.6 percent by weight, an average particle size of less than 0.1 micron and a pH of 9.9.

The silane employed in this example is gamma-aminopropyl-(triethoxy)silane, and when it is employed, it is present in a weight percent based on the weight of the solids of the resin binder.

The aforementioned binder, with or without the silane contained therein, as indicated in the table which follows, said binder is applied by dipping thereinto a tow (or roving) of continuous "water sized" glass fibers (water is the only size on the glass fiber), each fiber of which has a diameter of 0.00052 inch, and the wet tow (or roving) is dried at 500° F. at speeds of 35 to 40 feet per minute so as to resultantly add 1 weight percent binder (with or without silane), based on the weight of the glass. The dried treated glass fibers are cut to a length of ¼ inch and mechanically mixed with polypropylene molding resin having a particle size of about 200 microns, to provide a mixture containing 40 percent by weight treated cut glass fiber and 60 percent by weight polypropylene resin. A thorough mixture of glass fiber and polypropylene resin are introduced to a vertical screw extruder to produce a ⅜ inch diameter monofilament. The monofilament is introduced into an 8 by 8 by ⅛ inch male-female die where the male die is flat platen top and the filament is compression molded to form 8 by 8 by ⅛ inch plaques from which 4 by ¼ by ⅛ inch flexural test specimens are cut. The specimens are tested for flexural strengths using a Balwin P.T.E. Testing Machine according to ASTM D-790.

The following table shows the results:

| Resin Binder | Weight % Silane | Flexural Strength Pounds Per Square Inch |
| --- | --- | --- |
| 1a. | 60.8 | 13,000 |
| 1b. (no silane present) | — | 8,600 |

When the above-described procedure is repeated using an aqueous dispersion of a sodium salt, instead of an ammonium salt, of an ethylene-acrylic acid copolymer with a melt index of 150, said dispersion having a solids content 20 percent by weight, essentially the same results are obtainable.

As shown in the example, glass fiber can be treated with the mixture of organofunctional siloxane and ethylene copolymer and the treated fiber can be mixed with olefin polymer such as polypropylene, polyethylene, polybutadiene-1,3,poly-1-butene, and the like, to form mixtures which can be molded in an extruder, including injection molding, to form shaped reinforced plastic articles, without the destruction of the glass fiber as would occur absent the siloxane and ethylene copolymer treatment. As shown in the example, the presence of the siloxane, resulting from the hydrolysis of gamma-aminopropyl(triethoxy)-silane in the aqueous lattices, enhances the reinforcement of the polypropylene resin with glass fiber. The siloxane alone, absent the ethylene copolymer, does not give as good results as the combination of siloxane and ethylene copolymer. Thus the treatment of glass fiber as prescribed pursuant to this invention not only protects the glass fiber during molding but also yields a molded product having greater strength.

What is claimed is:

1. An inorganic oxide substrate which contains coated thereon an aqueous mixture of:
   a. an organo-functional hydrolyzable and condensible silane of the formula

which forms a siloxane structure capable of intimate and effective bonding with the substrate upon evaporation of essentially all the water of said mixture, said siloxane retaining the functional grouping X which is condensible with a carboxylic acid group; and wherein X contains the functional group selected from the group consisting of

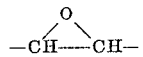

—NH—, HS—, HO—, and O = C = N—, at least one free valence of said group enters into the bond to R' and any remaining free valences are bonded to hydrogen, R' is a polyvalent saturated hydrocarbon radical containing at least three carbon atoms in sequence therein separating X from Si, provided that when X is HS—, R' may contain two carbon atoms in sequence separating X from Si; and Y is a hydrolyzable group selected from the group consisting of alkoxy, aroxy, halogen and amino; and b. a water-dispersible salt of a copolymer of ethylene and at least one of acrylic acid and methacrylic acid, which copolymer contains at least 14 and not more than 55 weight percent, based on the weight of the copolymer, of polymer units therein derived from at least one of acrylic acid or methacrylic acid, and said copolymer has a melt index range from 0.1 decigram per minute to 1,000 decigrams per minute.

2. claim 1 wherein the inorganic oxide substrate is a metal oxide substrate.

3. claim 1 wherein the inorganic oxide substrate is a siliceous filler.

4. A fiber glass substrate which contains coated thereon an aqueous mixture of:
a. a silane of the formula
XR'SiY$_3$
which forms a siloxane structure capable of intimate and effective bonding with the fiber glass substrate upon evaporation of essentially all the water of said mixture, said siloxane retaining the functional grouping X which is condensible with a carboxylic acid group; wherein X contains the functional group selected from the group consisting of

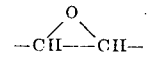

—NH—, HS—, HO— and O = C = N—, at least one free valence of said group enters into the bond to R' and any remaining free valences are bonded to hydrogen, and wherein R' is a polyvalent saturated hydrocarbon radical containing at least three carbon atoms in sequence therein separating X from Si, provided that when X HS—, HS—R' may contain two carbon atoms in sequence separating X from Si; and Y is a hydrolyzable group selected from the group consisting of alkoxy, aroxy, halogen and amino; and b. a water-dispersible salt of a copolymer of ethylene and at least one of acrylic acid and methacrylic acid, which copolymer contains at least 14 and not more than 55 weight percent, based on the weight of the copolymer, of polymer units therein derived from at least one of acrylic acid or methacrylic acid, and said copolymer has a melt index range from 0.1 decigram per minute to 1,000 decigrams per minute.

5. claim 4 wherein the silane is gamma-aminopropyl-triethoxy silane.

6. The substrate of claim 4 wherein the substrate is mixed with a polyethylene resin.

7. The product of claim 4 wherein the substrate is mixed with a polypropylene resin.

* * * * *